C. E. CLAYTON.
COOKING VESSEL.
APPLICATION FILED FEB. 17, 1917.
1,272,222. Patented July 9, 1918.
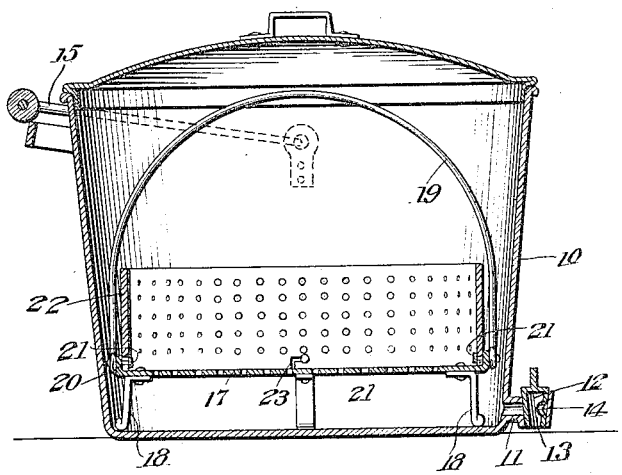
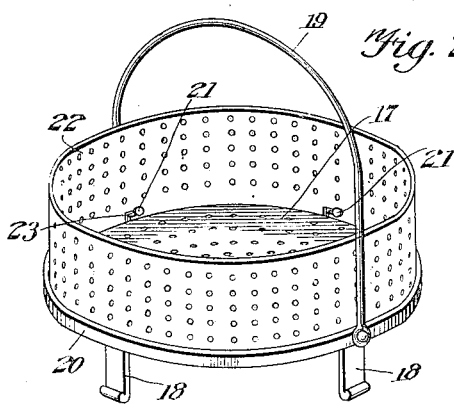
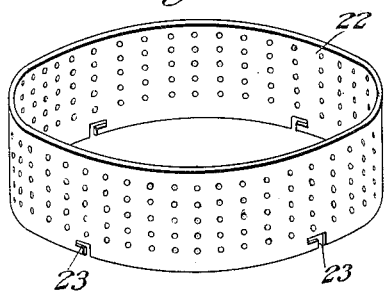
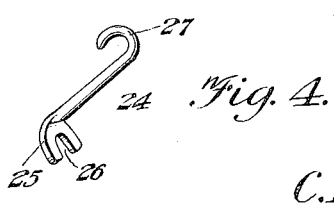
WITNESSES
INVENTOR
C. E. Clayton,
BY Victor J. Evans
ATTORNEY

UNITED STATES PATENT OFFICE.

CHARLOTTE E. CLAYTON, OF FORESTON, MINNESOTA.

COOKING VESSEL.

1,272,222.   Specification of Letters Patent.   Patented July 9, 1918.

Application filed February 17, 1917. Serial No. 149,257.

*To all whom it may concern:*

Be it known that I, CHARLOTTE E. CLAYTON, a citizen of the United States, residing at Foreston, in the county of Millelacs and State of Minnesota, have invented new and useful Improvements in Cooking Vessels, of which the following is a specification.

This invention relates to cooking vessels and aims to provide a construction susceptible for use with various kinds of cooking, the invention embodying a number of parts that can be quickly and easily assembled, or disassembled as the occasion may require.

Another object of the invention resides in the provision of a vessel of the above mentioned character, which can be conveniently handled and used without burning either its contents or the hands of the user, means being provided whereby the liquid can be readily and easily drawn from the vessel when desired.

In carrying out the invention I make use of a perforated tray susceptible for use in conjunction with the cooking vessel proper and adapted to be arranged within the latter, the tray consisting of several parts that can be readily associated to increase the capacity of the tray, or separated as desired.

The nature and advantages of the invention will be better understood from the following detail description when taken in connection with the accompanying drawing, the invention residing in the construction, combination and arrangement of parts as claimed.

In the drawing forming part of this specification like numerals of reference indicate similar parts in the several views and wherein:—

Figure 1 is a vertical sectional view through the vessel showing the tray arranged therein.

Fig. 2 is a detail view of the tray with the auxiliary rim associated therewith.

Fig. 3 is a detail view of the rim.

Fig. 4 is an elevation of the tool employed for handling the vessel.

Referring to the drawing in detail 10 indicates generally the cooking vessel proper which may be constructed from any suitable material and design, and formed immediately adjacent the bottom thereof with an outlet nipple 11, in which is rotatably mounted a valve plug 12, the latter having vertical and transverse communicating passages 13 and 14 respectively, so that when the transverse passage is arranged to communicate with the interior of the vessel, the liquid contained therein can be readily and easily drawn off. The vessel is further provided with a swinging bail 15 by means of which the vessel can be conveniently handled. It will be noted that the outlet nipple is so disposed with respect to the bottom of the vessel that the latter can be drained of practically all its liquid.

The invention further embodies a perforated tray 17 adapted to be arranged within the vessel in the manner illustrated in Fig. 1 for the cooking or steaming of certain edibles. The perforations in the tray are of a size to prevent peas, beans and the like from passing therethrough. The tray is provided with a plurality of legs or supports 18 whereby the tray is spaced from the bottom of the vessel as shown. A handle or bail 19 is also provided for the convenience of inserting or removing the tray into or from the vessel. The tray is provided with a relatively narrow rim 20, and projecting from this rim at appropriate points, is a plurality of headed studs 21 which serve to maintain the auxiliary rim positioned upon the tray in the manner to be presently described. The auxiliary rim is indicated at 22 and is employed with the tray when cooking peas, beans or the like, with a view of increasing the capacity of the tray, as well as preventing the peas or beans from falling from the tray as the latter is being inserted into the vessel or removed therefrom. The auxiliary rim is preferably perforated as shown, and also provided with a plurality of substantially L-shaped slots 23 which open at the lower edge of the rim to receive the headed studs 21, whereby the rim is immovably held associated with the tray.

In connection with my invention I also make use of a tool of the design shown in Fig. 4, the tool embodying a shank 24 provided with a relatively broad right angularly disposed end extension 25, which is bifurcated as at 26 to accommodate itself to the valve plug for the turning thereof when desired, the use of the tool in this capacity eliminating all possibility of burning of the hands, when it is desired to drain the liquid from the vessel. The opposite end of the shank 24 terminates to provide a hook 27 which is utilized to engage the handle or bail of the vessel 10 or of the tray, when it is desired to lift the parts or carry the same from place to place. When the hook extremity of the tool is used, the relatively broad end extension 25 provides a satisfactory handle for the tool.

While it is believed that from the foregoing description the nature and advantages of the invention will be readily apparent, I desire to have it understood that what is herein shown and described is merely illustrative of the preferred embodiment of the invention, and that such changes may be resorted to when desired as fall within the scope of what is claimed.

What is claimed is:—

The combination with a cooking vessel, of a tray removably disposed therein and including a perforated bottom, legs secured to said bottom and supporting the tray in spaced relation to the bottom of the vessel, a vertical peripheral flange on said bottom, a bail, pins pivoting said bail externally upon said flange and projecting inwardly of the flange, and an auxiliary perforated wall disposed upon said bottom inwardly of said flange and provided at its lower edge with bayonet slots engaging said pins whereby said wall is removably secured to said flange.

In testimony whereof I affix my signature.

CHARLOTTE E. CLAYTON.